(12) United States Patent
Kleijn et al.

(10) Patent No.: US 9,672,833 B2
(45) Date of Patent: Jun. 6, 2017

(54) SINUSOIDAL INTERPOLATION ACROSS MISSING DATA

(71) Applicant: GOOGLE INC., Mountain View, CA (US)

(72) Inventors: Willem Bastiaan Kleijn, Lower Hutt (NZ); Turaj Zakizadeh Shabestary, Mountain View, CA (US)

(73) Assignee: Google Inc., Mountain View, CA (US)

( * ) Notice: Subject to any disclaimer, the term of this patent is extended or adjusted under 35 U.S.C. 154(b) by 347 days.

(21) Appl. No.: 14/194,192

(22) Filed: Feb. 28, 2014

(65) Prior Publication Data

US 2015/0248893 A1 Sep. 3, 2015

(51) Int. Cl.
*G10L 19/00* (2013.01)
*G10L 19/02* (2013.01)
(Continued)

(52) U.S. Cl.
CPC ............ *G10L 19/02* (2013.01); *G10L 19/005* (2013.01); *G10H 2210/051* (2013.01);
(Continued)

(58) Field of Classification Search
CPC . G10L 19/14; G10L 19/04; G10L 9/00; G10L 11/06; G10L 19/02; G10L 19/005; G10L 19/06; G10L 19/097; G10L 19/09; G10L 15/14; G10H 2210/051; G10H 2210/061; G10H 2250/235; G10H 2250/541
USPC ....... 704/205, 219, 206, 207–209, 203, 265, 704/262, 243, 240; 381/98, 29–40; 341/61, 67, 143, 144; 375/227
See application file for complete search history.

(56) References Cited

U.S. PATENT DOCUMENTS

| 3,649,765 A * | 3/1972 | Rabiner | G10L 19/02 704/209 |
| 5,517,595 A * | 5/1996 | Kleijn | G10L 19/097 704/205 |

(Continued)

OTHER PUBLICATIONS

Mathieu Lagrange et al, Long Interpolation of Audio Signals Using Linear Prediction in Sinusoidal Modeling, Jul. 28, 2005, Journal of the Audio Engineering Society, vol. 53, No. 10, pp. 891-905.*

(Continued)

*Primary Examiner* — Vivian Chin
*Assistant Examiner* — Ubachukwu Odunukwe
(74) *Attorney, Agent, or Firm* — Brake Hughes Bellermann LLP

(57) ABSTRACT

Provided are methods and systems for concealing missing segments and/or discontinuities in an audio signal, thereby restoring the continuity of the signal. The methods and systems are designed for and targeted at audio signals, are based on interpolation and extrapolation operations for sinusoids, and do not rely on the assumption that the sinusoids are harmonic. The methods and systems are improvements over existing audio concealment approaches in that, among other advantages, the methods and systems facilitate asynchronous interpolation, use an interpolation procedure that corresponds to time-domain waveform interpolation if the signal is harmonic, and have a peak selection procedure that is effective for audio signals.

20 Claims, 8 Drawing Sheets

(51) Int. Cl.
*G10L 19/005* (2013.01)
*G10L 19/04* (2013.01)
*G10L 19/06* (2013.01)
*G10L 15/14* (2006.01)

(52) U.S. Cl.
CPC . *G10H 2210/061* (2013.01); *G10H 2250/235* (2013.01); *G10H 2250/541* (2013.01); *G10L 15/14* (2013.01); *G10L 19/04* (2013.01); *G10L 19/06* (2013.01)

(56) References Cited

U.S. PATENT DOCUMENTS

| | | | | |
|---|---|---|---|---|
| 6,377,915 | B1* | 4/2002 | Sasaki | G10L 19/04 704/206 |
| 6,747,581 | B2* | 6/2004 | Hodges | H04M 9/08 341/61 |
| 2003/0055632 | A1* | 3/2003 | Chen | G10L 19/005 704/219 |
| 2004/0002856 | A1* | 1/2004 | Bhaskar | G10L 19/097 704/219 |
| 2004/0054525 | A1* | 3/2004 | Sekiguchi | G10L 21/04 704/205 |
| 2008/0177533 | A1* | 7/2008 | Teo | G10L 19/0204 704/207 |
| 2010/0228542 | A1* | 9/2010 | Zhan | G10L 19/005 704/203 |

OTHER PUBLICATIONS

M. Nilsson, B. Resch, M-Y. Kim, and W.B. Kleijn, "A canonical representation of speech," In Proceedings IEEE International Conference on Acoustics, Speech, and Signal Processing, vol. IV, Apr. 2007, pp. 849-852.

R. J. McAulay and T.F. Quatieri, "Speech analysis/synthesis based on a sinusoidal representation," IEEE Transactions on Acoustics, Speech, and Signal Processing, vol. 34, No. 4, pp. 744-754, Aug. 1986.

R. Maher, "A method for extrapolation of missing digital audio data", J. Audio Eng. Soc., vol. 42, No. 5, pp. 350-357, May 1994.

S.J. Godsill and P.J.W. Rayner, Digital audio restoration—a statistical model based approach, pp. 99-134, Springer, Sep. 21, 1998.

Lagrange M. et al., "Long Interpolation of Audio Signal Using Linear Prediction in Sinusoidal Modeling", Journal of the Audio Engineering Society, vol. 53, No. 10, Oct. 1, 2005, pp. 891-905.

* cited by examiner

| | Object | Amplitude | Frequency Location | Future/Past Spectrum | List Location Of Matching Object |
|---|---|---|---|---|---|
| 1 | Object 1 | (amplitude) | (frequency) | Future | 3 |
| 2 | Object 2 | (amplitude) | (frequency) | Past | 5 |
| 3 | Object 3 | (amplitude) | (frequency) | Past | 1 |
| ... | ... | ... | ... | ... | ... |
| N | Object N | (amplitude) | (frequency) | Future | X |

FIG. 7

SINUSOIDAL INTERPOLATION ACROSS MISSING DATA

BACKGROUND

Packet loss and clock drift between different devices can lead to missing segments or discontinuities in audio signals. Both the insertion of zeros and discontinuities in the signal are clearly audible to individuals. While various approaches have been proposed for restoring the continuity of the signal, such approaches are generally aimed only at speech signals, and do not work well for audio generally.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for signal processing. More specifically, aspects of the present disclosure relate to concealing missing segments and/or discontinuities in an audio signal using interpolation and extrapolation operations.

One embodiment of the present disclosure relates to a computer-implemented method comprising: computing spectra of segments of an audio signal, the segments located on opposite sides of a missing segment of the audio signal; determining magnitude peaks of the computed spectra; ordering the determined peaks according to magnitude; determining neighbor peaks on the opposite side of the missing segment from the peaks, thereby forming pairs of spectral peaks; and performing interpolation across the missing segment of the audio signal using the pairs of spectral peaks to generate restoration data for the missing segment.

In another embodiment, the computer-implemented method further comprises fading the restoration data with data of the segments located on opposite sides of the missing segment.

In another embodiment, the computer-implemented method further comprises: smoothing a magnitude spectrum of the signal; determining a sign of the local slope of the smoothed spectrum; generating estimates of the peaks based on points where the sign of the local slope changes from positive to negative; and determining true locations for each of the peaks by searching the unsmoothed signal in a neighborhood of the corresponding estimated peak.

In another embodiment, a level of the interpolation performed is selected from a range of interpolation intervals to maximize a measure of alignment of an instantaneous waveform produced by the interpolator and an instantaneous waveform estimated from a known signal segment.

Another embodiment of the present disclosure relates to a computer-implemented method comprising: computing a spectrum of a first segment of an audio signal and a spectrum of a second segment of the audio signal, wherein the first segment is located on a first side of a missing segment of the signal and the second segment is located on a second side of the missing segment of the signal; identifying a plurality of objects in the spectra of the first segment and the second segment, wherein the plurality of objects corresponds to peaks; sorting the identified objects according to amplitudes of the corresponding peaks; determining an index of the sorted objects; and identifying, for at least one of the objects, a matching object.

In yet another embodiment, the step of identifying the plurality of objects in the spectra of the first segment and the second segment in the computer-implemented method includes creating a list of objects, one object for each peak of both the spectra of the first segment and the spectra of the second segment.

In still another embodiment, the step of identifying, for at least one of the objects, a matching object in the computer-implemented method includes: identifying, for an object, candidate matching objects by performing a search over all other objects; eliminating from the candidate matching objects all objects that already have a matching object; evaluating, for each of the remaining candidate matching objects, a matching criterion; and selecting one of the remaining candidate matching objects as the matching object for the object based on the evaluated matching criterion.

In yet another embodiment, the computer-implemented method further comprises restricting the remaining candidate matching objects to objects with peaks from the complementary spectrum and objects with peaks that are nearby in frequency.

In still another embodiment, the computer-implemented method further comprises identifying an object without candidate matching objects, and creating a virtual peak having a frequency identical to the frequency of the object and having either zero amplitude or an amplitude of the complementary spectrum at the identical frequency.

In another embodiment, the computer-implemented method further comprises identifying an object without candidate matching objects, and eliminating the object from the plurality of objects.

Yet another embodiment of the present disclosure relates to computer-implemented method comprising: computing spectra of segments of an audio signal, the segments located on opposite sides of a missing segment of the audio signal; determining magnitude peaks of the computed spectra; ordering the determined peaks according to magnitude; determining neighbor peaks on the opposite side of the missing segment from the peaks, thereby forming pairs of spectral peaks; and performing interpolation across an interval of the missing segment of the audio signal, wherein a length of the interval is determined based on aligning corresponding sets of phase offsets weighted according amplitudes of the phase offsets.

In one or more other embodiments, the methods and systems described herein may optionally include one or more of the following additional features: the interpolation is sinusoidal interpolation; each pair of peaks is comprised of a first peak on a first side of the missing segment and a second peak on a second side of the missing segment; neighbor peaks are determined for each of the peaks beginning with the highest peak; the restoration data is faded with data of the segments located on opposite sides of the missing segment using an overlap-add operation; the magnitude spectrum of the signal is smoothed by applying a low-pass filter to the spectrum; the range of interpolation intervals is chosen to fill a jitter buffer of a receiving device to a level consistent with expected packet losses; a matching object is identified for the at least one of the objects beginning with the object with the largest peak and continuing to the object with the smallest peak, according to the index of the sorted objects; the list of objects includes, for each of the objects in the list, an amplitude of the corresponding peak, a frequency where the corresponding peak is located, a label specifying if the corresponding peak belongs to the first or second spectrum, and a location of a matching peak in the spectrum complementary to the spectrum in which the corresponding peak belongs; and/or the one of the remaining candidate matching objects is selected as the matching object based on the candidate matching object having a highest value for the evaluated matching criterion.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

FIG. 7 is a table illustrating example data for objects corresponding to sinusoidal peaks in past and future spectra of a missing segment of an audio signal according to one or more embodiments described herein.

Figure 1:
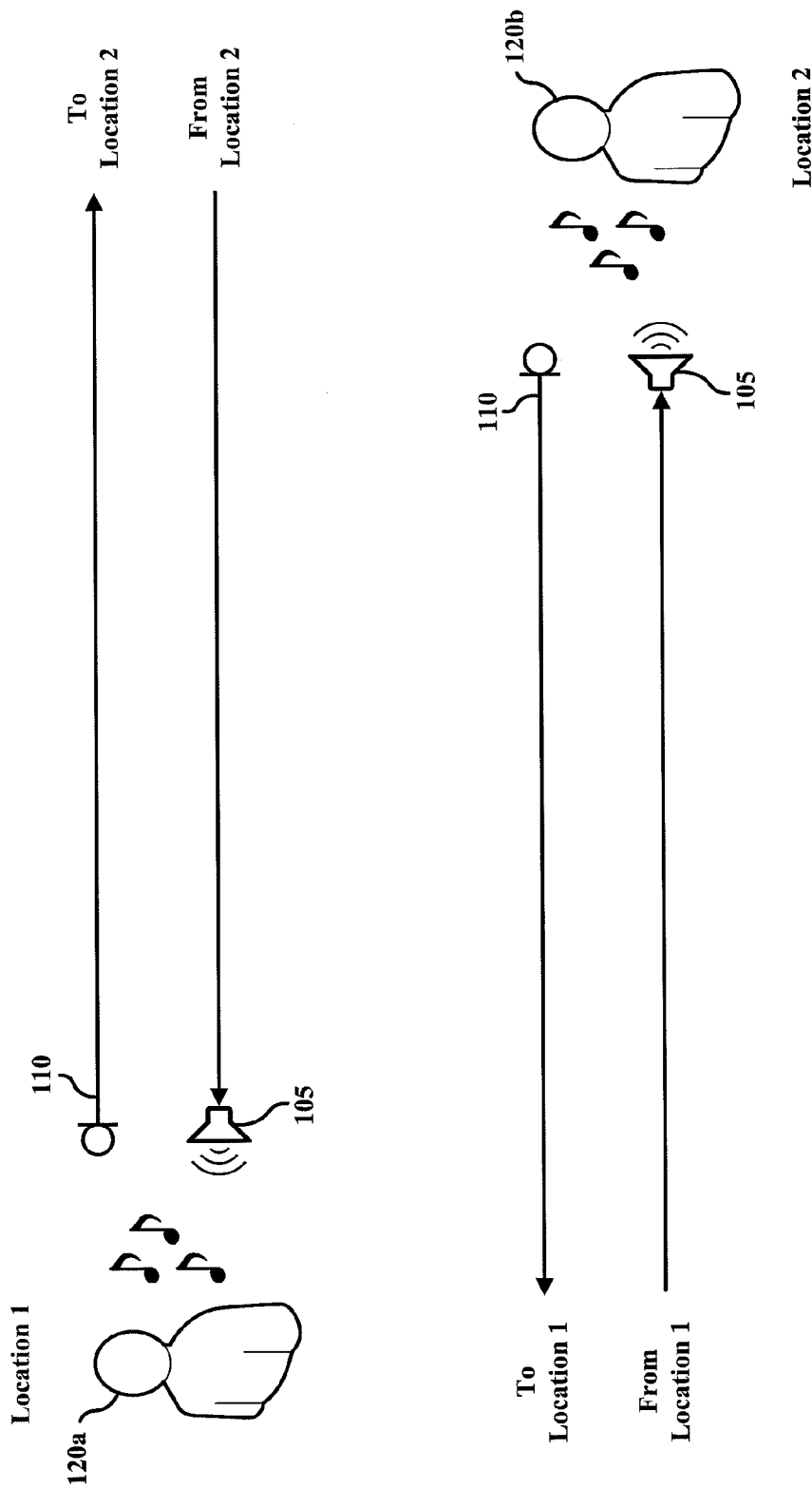
FIG. 1 is a schematic diagram illustrating an example application for concealing missing segments and/or discontinuities in an audio signal using interpolation and extrapolation operations according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Overview

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

Embodiments of the present disclosure relate to methods and systems for concealing (e.g., restoring) missing segments and/or discontinuities in an audio signal and thereby restoring the continuity of the signal. The methods and systems are based on interpolation and extrapolation operations, and may also be used to stretch or shorten audio segments.

Methods that restore missing segments and/or discontinuities in an audio signal are sometimes referred to as packet-loss concealment methods. Conventional packet-loss concealment methods typically have been aimed only at speech, as speech signals are prevalent in real-time applications where retransmission is not possible. However, with the proliferation of Internet-based applications, packet-loss concealment for general audio signals has become more important. Existing packet-loss concealment methods that are aimed only at speech rely heavily on the pitch structure of the speech signal and, as a result, these methods do not perform well for music, where the signal structure generally is more complex and is not well represented by the simple model that can be used for speech. Accordingly, the methods and systems of the present disclosure are designed to perform well for audio (in the more general sense as compared to only speech) applications.

In view of the deficiencies of existing approaches described above, embodiments of the present disclosure provide methods and systems for concealing packet loss and discontinuities in audio signals that is capable of operating in real-time.

As will be described in greater detail herein, an extrapolation is followed by an interpolation and an interpolation is followed by observed data. Both the interpolation and extrapolation operations represent the signal as a sum of sinusoids. In accordance with one or more embodiments, for extrapolation, a set of sinusoids may be detected in the last observed data, while for interpolation a first set of sinusoids may be detected in the data observed or generated before the missing segment and a second set of sinusoids may be detected in the observations after the missing data segment.

In accordance with at least one embodiment described herein, the interpolation method of the present disclosure sorts the sinusoids by their amplitude before pairing up sinusoids observed before and after the missing segment. The sinusoids are described as the real part of a complex exponential. The complex gain and the frequency of the sinusoid are linearly interpolated.

As will be described in greater detail below, the interpolation method can operate in two modes: a synchronous mode and an asynchronous mode. In the synchronous mode the length of the segment of missing data is fixed (and normally consistent with the original signal). If the interpolation model does not fit the data well in the synchronous mode, the complex exponentials will have excursions in their amplitude, which may be audible. In the asynchronous mode the length of the missing data segment is adjusted to reduce the significance of these excursions.

FIG. 1 illustrates an example application for the extrapolation and interpolation of audio signals in accordance with one or more embodiments of the present disclosure. For example, two users (e.g., musicians) 120a and 120b may be playing music at different physical locations (e.g., remote environments), where user 120a is at "Location 1" and user 120b is at "Location 2." In addition, the users 120a and 120b may be in communication with each over, for example, a wired connection or network, and each of the users 120a and 120b may have a loudspeaker 105 and a microphone 110 for rendering and capturing, respectively, audio (e.g., music) signals. A plurality of signal sources 105 (e.g., loudspeakers) may be located amongst a plurality of sensors 120 (e.g., microphones, individuals, other audio capture devices, etc.).

When transmitting data (e.g., audio) packets across a communications network, packets may sometimes go missing for an extended period of time, or get lost altogether, before being received at a receiving end of the network. When packets go missing during transmission, something must be done to compensate for such loss of data. For example, one existing approach is to insert zeros in place of the missing data. However, such an approach provides an inadequate solution as users are subject to degraded performance and audio quality.

Other conventional packet-loss concealment methods, which are aimed at the restoration of speech signals, typically extrapolate a received segment of the signal by means of an autoregressive (AR) model (e.g., a filter), or some approximation thereof. Autoregressive models for speech usually can be seen as a concatenation of a short-term model and a long-term model. The short-term model describes the spectral envelope and the long-term model describes the pitch structure. More important for packet-loss concealment is the long-term model, which typically captures correlations ranging from 2.5 to 15 milliseconds (ms). In some cases the long-term model is assigned a unity filter gain. Some existing approaches to packet-loss concealment make minimum mean square error extrapolation estimates of the missing segments by running the AR models (e.g., filters) with zero excitation over the gap of missing samples, the initial filter state being based on the signal prior to the gap.

If both a past segment and a future segment of the signal are known when the concealment operation is started, then interpolation can be used. Interpolative approaches have conventionally been used in signal restoration (e.g., for damaged recordings), which typically involved shorter gaps.

One existing interpolative method based on the AR signal model describes a complete coding scheme that considers the encoder as a set of measurements for a Kalman estimator, which naturally leads to optimal interpolation when packets are lost and can account for known data in the future and in the past in relation to the gap. However, this existing approach is not compatible for operation in conjunction with existing coders.

Some existing approaches explore methods other than AR models for extrapolation or interpolation over segments where data are missing. For example, one approach uses a well-known sinusoidal model for interpolation between sinusoids identified from spectra of the signal before and after the gap. Other approaches model the signal as a sum of appropriate basis vectors and an AR model and then simultaneously optimize the gains of the basis vectors and the AR model signal contribution. The basis vectors can be sinusoids, but no effective selection process for the basis vectors is provided in such methods.

In general, existing interpolation methods are computationally expensive. For example, one approach attempts to predict the time-frequency track of the sinusoids across very long segments of missing data with a linear predictor. In practice, the prediction of such tracks cannot be made reliable. In another approach, a harmonic sinusoidal model is used to interpolate between known speech segments, in conjunction with a hidden Markov model (HMM) to track the evolution of speech features. The harmonic assumption implies that such a method is not effective for audio signals.

To overcome the various shortcomings of existing approaches to audio concealment, embodiments of the present disclosure provide improved methods and systems for extrapolation and interpolation over missing segments. As will be described in greater detail herein, the methods and systems are designed for and targeted at audio signals, are based on the interpolation and extrapolation of sinusoids, and do not rely on the assumption that the sinusoids are harmonic.

Among other advantages and improvements over existing approaches, the methods and systems of the present disclosure (i) facilitate asynchronous interpolation, (ii) use an interpolation procedure that corresponds to time-domain waveform interpolation if the signal is harmonic, and (iii) have a peak selection procedure that is effective for audio signals.

The following presents the motivation for the sinusoids-based approach to interpolation and extrapolation of the present disclosure, provides details on the overall architecture of the method, and further describes the various components comprising the system.

A Fourier transform represents a signal (e.g., an audio signal) in a basis of complex exponentials. Since the signal is real, the expansion in complex exponentials can be rearranged as an expansion in sinusoids. As such, the spectral peaks can be interpreted as gains of sinusoids at the peak frequency. Whereas a Fourier transform expands the signal in terms of steady-state sinusoids (in the case of a discrete Fourier transform, the sinusoids extend over a finite time segment), a natural extension of this view is to see the signal as a summation of sinusoids that have continuously changing gain and frequency. A Fourier transform over a windowed signal segment can then be interpreted as an approximate snapshot of the state of these sinusoids, with each peak representing a sinusoid. The gradual roll-off of the magnitude from the peaks in this snapshot (which may also be considered the finite resolution of the snapshot) is a side-effect of using a finite window length. It is then possible to interpolate the individual sinusoids between the snapshots. This principle forms part of the basis of the methods and systems for interpolation over missing segments of audio signals in accordance with one or more of the embodiments described herein.

As will be described in greater detail below, the algorithms of the present disclosure aim to restore a segment of consecutive missing data samples (where such segment may be a missing segment or a discontinuity in the audio signal). While data is nearly always available at the past end of a missing data segment, such is not necessarily the case for the future side of the segment. In accordance with at least one embodiment, the length of the data segment to be restored may be specified before the algorithm is started. The restoration segment can be shorter than the missing data segment, thus allowing for the case where data for the future side of the missing segment has not yet been received. In that case, the algorithm may perform extrapolation. In a scenario where data is available for the future side of the missing segment, then interpolation may be performed over the missing segment. As such, in accordance with at least one embodiment of the method, a subsequent set of extrapolation operations is followed by an interpolation operation and an interpolation operation concludes the restoration of a missing data segment.

Figure 2:
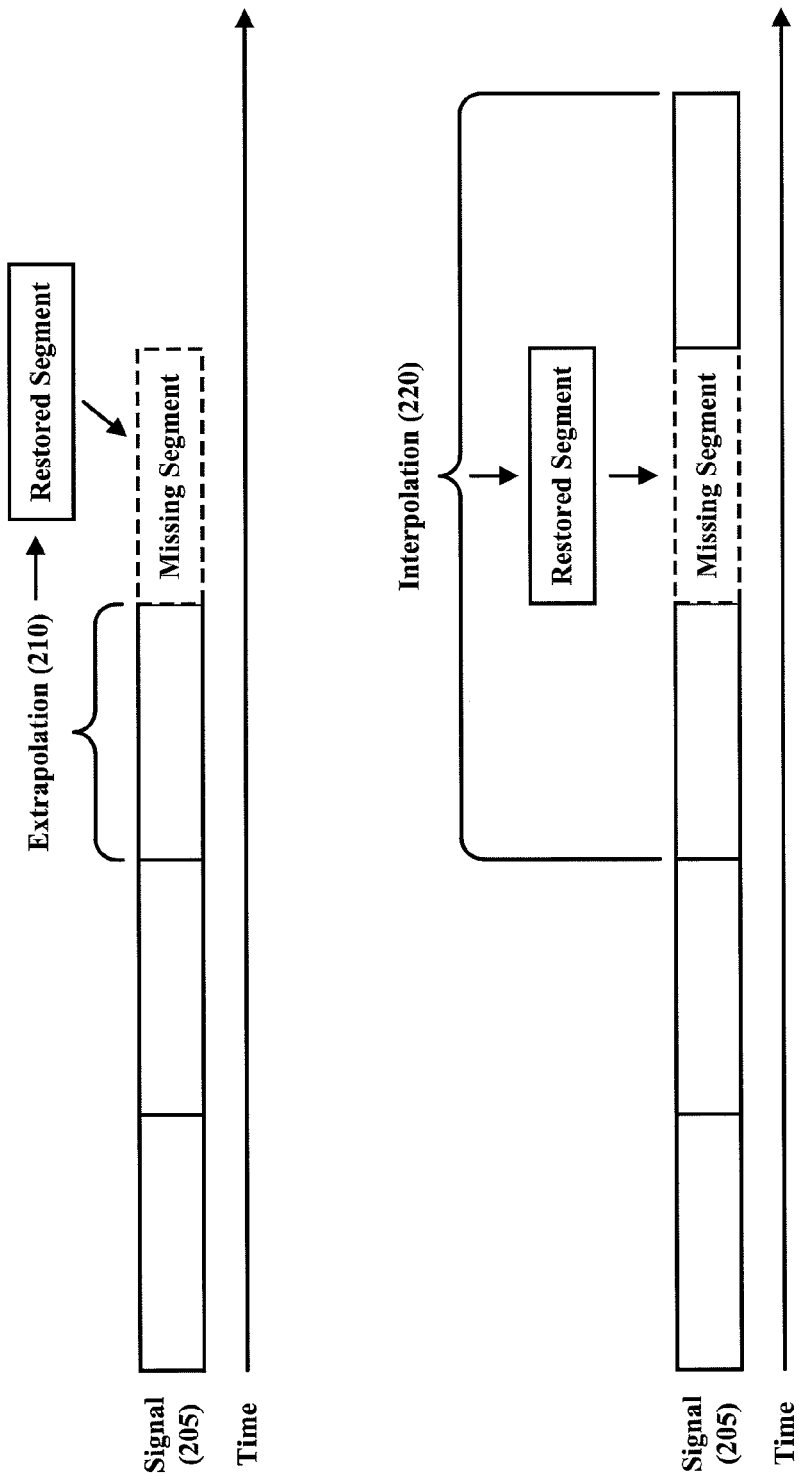
FIG. 2 is a schematic diagram illustrating a simplified example of interpolation and extrapolation operations on a signal according to one or more embodiments described herein.

FIG. 2 is a simplified example of interpolation (220) and extrapolation (210) operations on a signal 205 (e.g., audio signal) in accordance with one or more embodiments described herein. The application of extrapolation (210) differs from that commonly used in AR-model based systems, where the extrapolated signal is subject to a merging operation between the extrapolated data and signal data at the future side of the missing-data segment.

Figure 3:
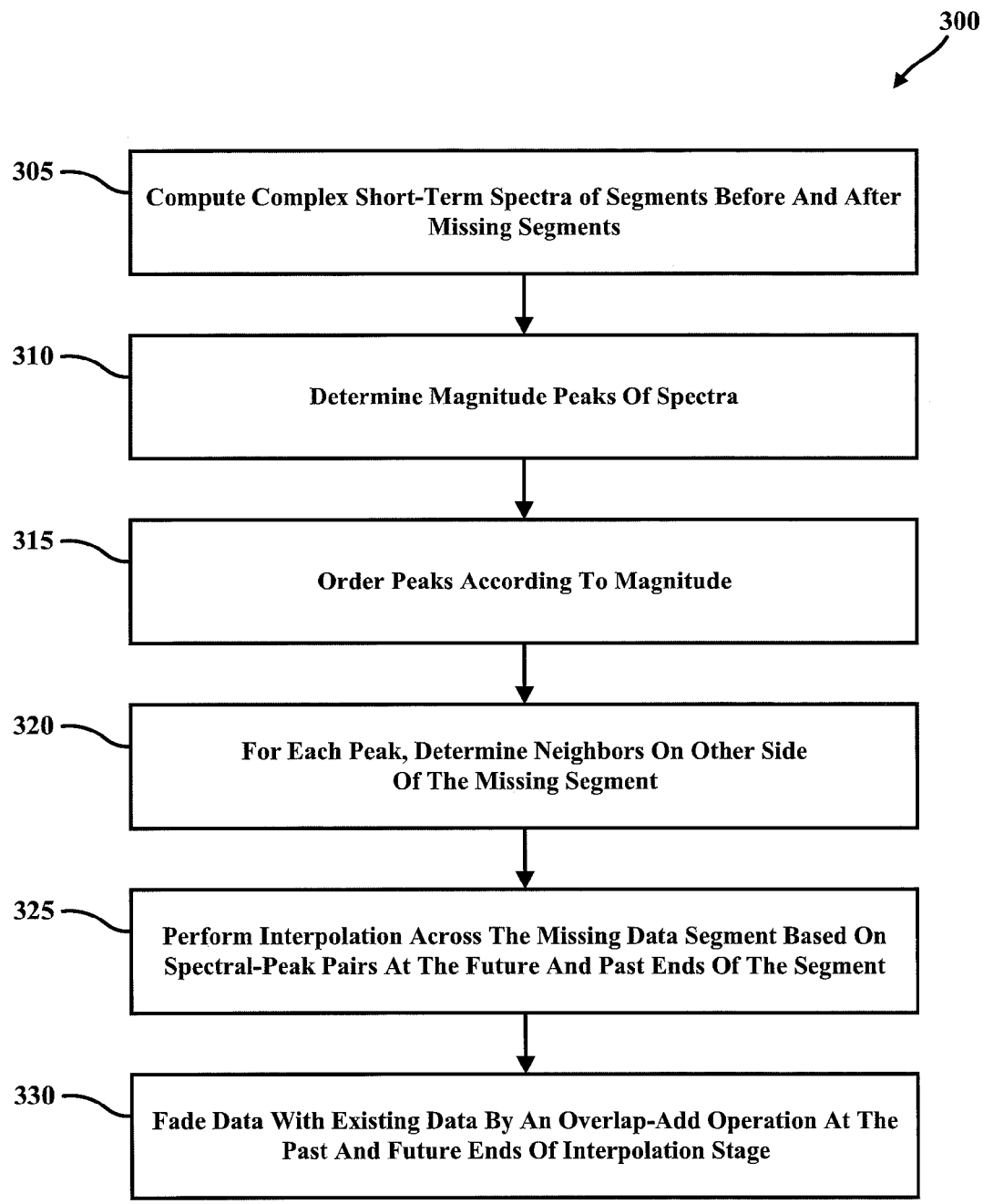
FIG. 3 is a flowchart illustrating an example interpolation method where data are available at both past and future ends of a segment of an audio signal to be restored according to one or more embodiments described herein.

FIG. 3 illustrates an example interpolation operation 300, where data are available at both past and future ends of a segment of an audio signal to be restored (e.g., sequentially before and after a missing segment of an audio signal), in accordance with one or more embodiments described herein.

At block 305, if not already available, complex short-term spectra of segments (e.g., first and second segments) of the audio signal located before and after a missing segment (e.g., located immediately or sequentially before and after the missing segment) may be computed. In at least one example, segments of the audio signal coming sequentially before (e.g., earlier in time than) the missing segment may be considered on a first side (or past end) of the missing segment while segments coming sequentially after (e.g., later in time than) the missing segment may be considered on a second side (or future end) of the missing segment.

At block 310, magnitude peaks of the spectra computed at block 305 may be determined.

At block 315, the peaks determined at block 310 may be ordered (e.g., arranged, listed, etc.) according to magnitude. For example, in accordance with at least one embodiment, the peaks determined at block 310 may be placed in list form and sorted by decreasing/increasing magnitude. It should be noted that peaks of the past end and the future end of the missing segment may be contained in a single list. For example, the list at block 310 may include information for each peak, whether the peak belongs to the past or future end of the missing segment.

At block 320, for each peak, starting from the highest peak, neighbors on the other side of the missing data segment (of the audio signal) may be determined, subject to some conditions. In accordance with at least one embodiment, peaks that have already been selected as a neighbor may be skipped during the performance of block 320. The sorting of the peaks according to magnitude ensures that the highest peaks have appropriate neighbors. It should be noted that the operations at block 320 may leave some small peaks that are not critical to audible performance unpaired (one method to deal with these remaining peaks is described in greater detail below).

At block 325, the resulting spectral-peak pairs at the future and past ends of the missing data segment may be used as a basis for interpolation across the segment.

At block 330, the data may be faded with the existing data by an overlap-add operation at the past and future ends of the interpolation stage.

In accordance with one or more embodiments, the extrapolation operation of the present disclosure is similar to the interpolation operation except that the future-end spectrum is replaced by the past-end spectrum with appropriate precession of the phase. The sinusoidal frequencies are assumed to be constant during extrapolation. In accordance with at least one embodiment, the fading operation may be omitted at the future end of an extrapolation operation if it is followed by another extrapolation. On the other hand, if it is followed by an interpolation, fading may be needed to account for small peaks that are not part of a future-past peak pair.

The following description provides additional details about the components of the packet-loss concealment method of the present disclosure.

Spectral Estimation and Peak Extraction

To be able to interpolate sinusoids, they need to be detected at both ends (the future end and the past end) of the missing segment, while extrapolation relies on sinusoids being detected at the past end of the segment. While this detection may be performed using various methods, it is important that the peak amplitude and frequency are found with a precision that facilitates perceptually accurate interpolation of the sinusoids. For example, a frequency resolution of at least 8 Hz performs well for this purpose.

In accordance with at least one embodiment, a 32 millisecond (ms) window may be used. At 16 kHz this window corresponds to 512 samples. The signal may be windowed with a Hann window and padded with zeros to obtain a sequence of 2048 samples, on which the Fast Fourier Transform (FFT) may be performed.

Figure 4:
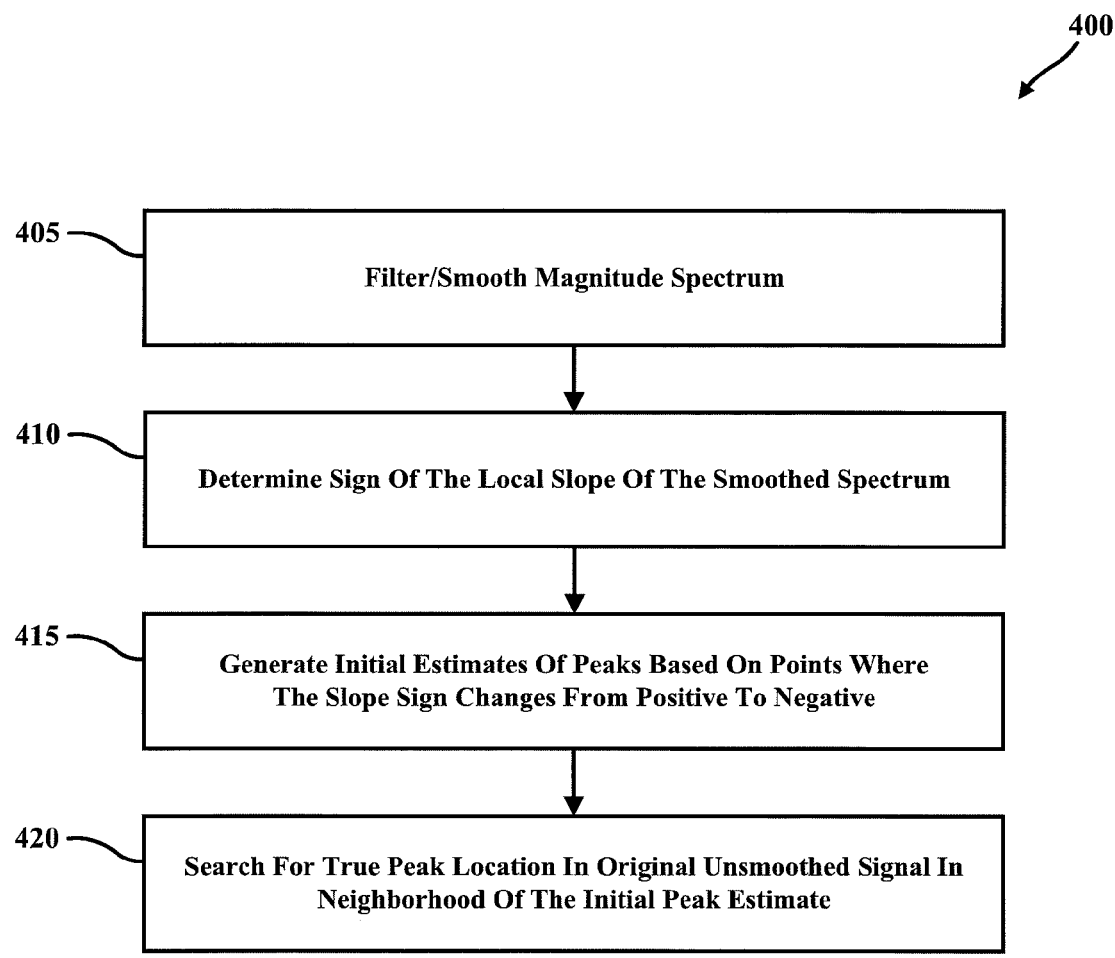
FIG. 4 is a flowchart illustrating an example method for peak extraction according to one or more embodiments described herein.

FIG. 4 illustrates an example process for peak extraction. The peak extraction process 400 operates on the magnitude spectrum and, in accordance with at least embodiment, includes blocks 405-420. At block 405, the magnitude spectrum may be low-pass filtered (e.g., smoothed) to ensure that small local peaks are not considered. In at least one implementation, this low-pass filtering on the spectrum at block 405 may be performed with a bandwidth of approximately 0.02 seconds.

At block 410, the sign of the local slope of the smoothed spectrum from block 405 may be determined.

At block 415, initial estimates of the peaks may be generated based on the points where the slope sign changes from positive to negative.

At block 420, the true peak location may be searched for in the original, unsmoothed signal, in a neighborhood of the initial peak estimate. For example, in accordance with at least one embodiment, the region that may be searched at block 420 may be half of the width of the inverse bandwidth (e.g., 25 Hz).

Pair Selection

For the interpolation case, the significant sinusoids identified at the past and future-ends of the missing signal segment may be paired up. In accordance with at least one embodiment, the method of the present disclosure orders the peaks and then, starting from the highest peaks, finds suitable complementary peaks. Starting from the largest peaks is an indication that the number of important mismatches is small (e.g., mismatches generally occur, if at all, only on minor peaks).

Figure 5:
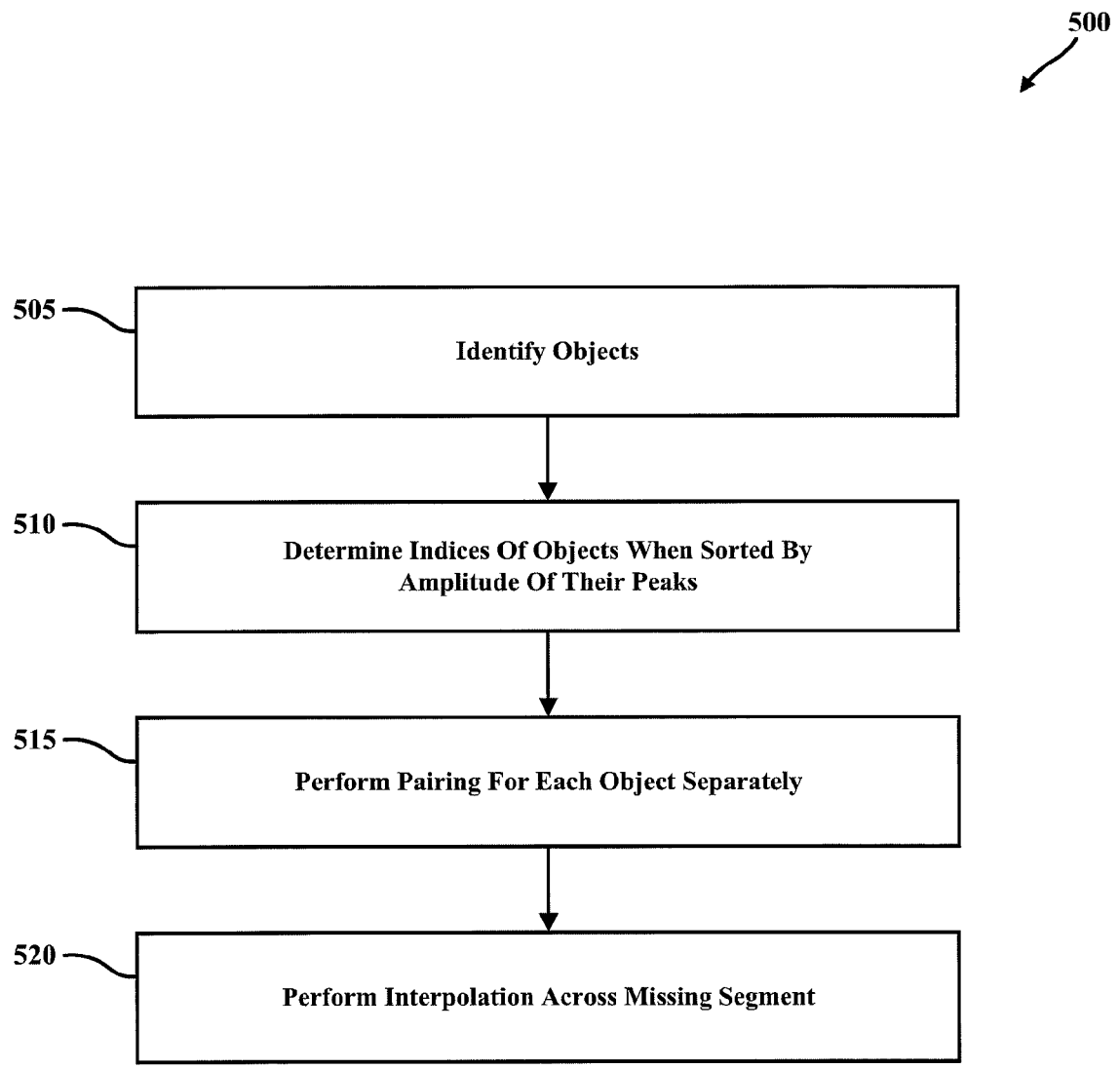
FIG. 5 is a flowchart illustrating an example method for selecting pairs of complementary peaks according to one or more embodiments described herein.

FIG. 5 illustrates an example process 500 for selecting pairs of complementary peaks in accordance with one or more embodiments described herein. At block 505, the process 500 identifies a plurality of objects (e.g., creates a list or collection of objects), wherein one object is identified for each peak of both the past and future spectra. The objective is now to find matches for the objects. In accordance with at least one embodiment, each identified object may have four labels: (1) the peak amplitude; (2) the frequency where the peak is located; (3) the label specifying if peak belongs to future or past spectrum; and (4) the location of the matching peak in the complementary spectrum (empty or zero if there is no match).

FIG. 7 illustrates an example table 700 containing data for each of the objects identified at block 505 of the example process 500, described above and illustrated in FIG. 5. In accordance with at least one embodiment, table 700 may include entry (or row) numbers 705 identifying each of the entries comprising table 700. Each entry 705 in the table 700 may be a different object 710 (e.g., the objects identified at block 505 in the example process 500) and may include, for each of the objects 710, the amplitude of the object (e.g., peak amplitude) 715, the frequency where the object is located 720, a label indicating whether the object belongs to future or past spectrum 725, and the location in the table 700 (e.g., entry number 705) of the matching peak in the complementary spectrum (which may be left empty or include zero if there is no match). It should be understood that in one or more embodiments described herein, table 700 may include various other data, arranged in various other formats, in addition to or instead of the example data and formats described above, which are provided only for purposes of illustration.

Referring back to the example process 500 of FIG. 5, at block 510, the indices of the objects when sorted by the amplitude of their peaks may be determined. At block 515, the actual pairing is performed for each object separately, moving from the object with the largest peak to the object with the smallest peak, using the index sequence for the sorted list. Additional details about the pairing of objects at block 515 will be described below with reference to FIG. 6. At block 520, the pairs of peaks at the future and past ends of the missing data segment (formed at block 515) may be used as a basis for interpolation across the segment.

Figure 6:
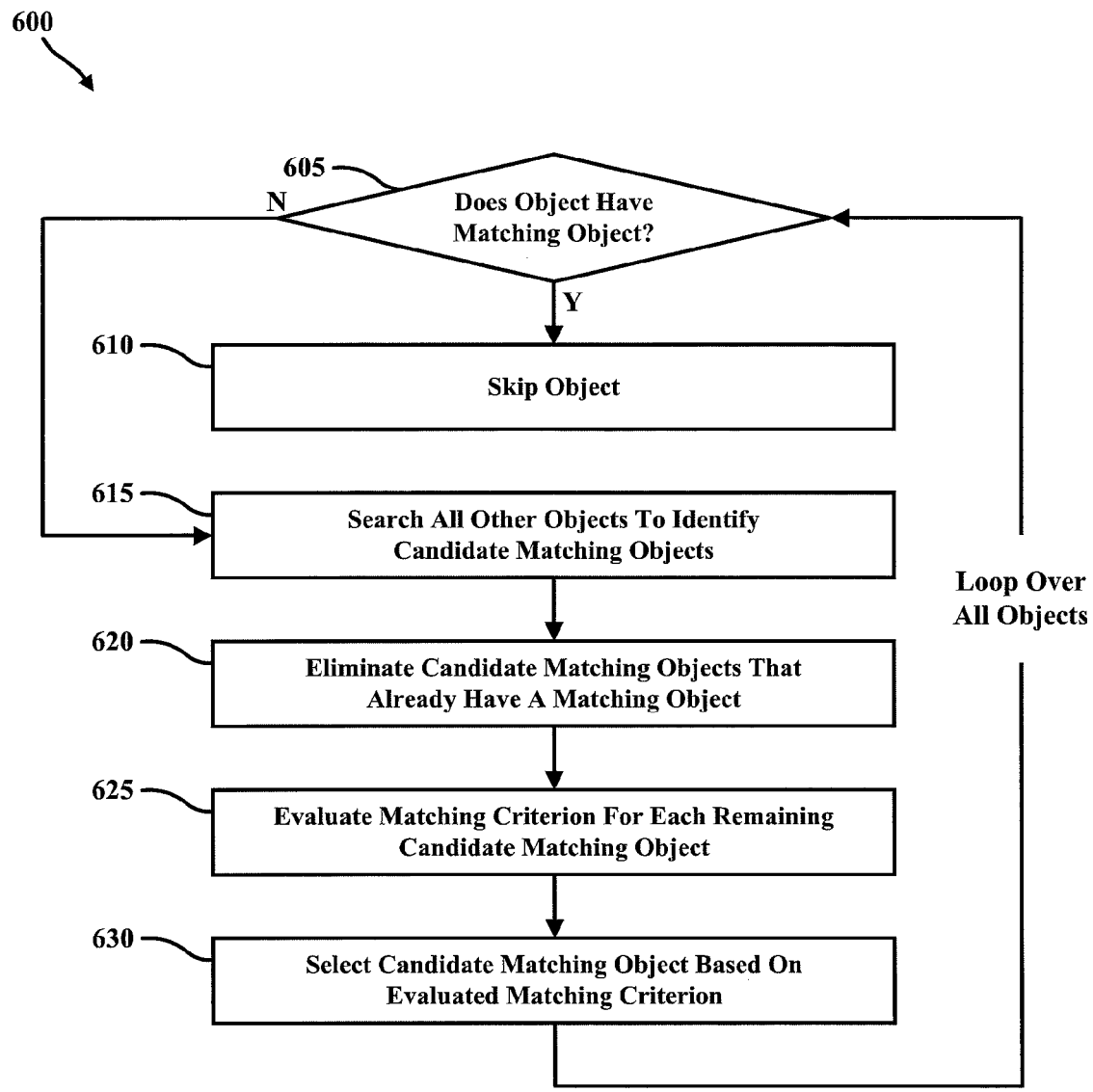
FIG. 6 is a flowchart illustrating an example method for pairing objects according to one or more embodiments described herein.

FIG. 6 illustrates an example process for pairing objects. In accordance with one or more embodiments described herein, example process 600 (blocks 605-640) may be part of block 515 in the example process 500 described above and illustrated in FIG. 5, where pairing is performed separately for each object in the list of objects created at block 505, beginning with the object with the largest peak to the object with the smallest peak, according to the index sequence for the sorted list.

It should be understood that, in accordance with at least one embodiment of the present disclosure, example process 600 (e.g., blocks 605-630 of the process 600) may be performed in an iterative manner for each of the objects in the list of objects created at block 505 of the example process 500 (e.g., one object for each peak of both the past and future spectra).

For each object, a determination may be made at block 605 as to whether the object being assessed (sometimes referred to in the following as the "current object" merely for clarity sake) has a matching object. If it is determined at block 605 that the current object does have a matching object, then the current object may be skipped at block 610.

On the other hand, if it is determined at block 605 that the current object does not have a matching object, then at block 615 a search for matching objects may be performed over all other objects to identify candidate matching objects.

At block 620, candidate matching objects that already have a matching object may be eliminated as candidate matching objects (e.g., removed from the list of candidate matching objects).

At block 625, a matching criterion may be evaluated for each of the remaining candidate matching objects. An example matching criterion is provided in greater detail below in equation (1).

At block 630, one of the candidate matching objects may be selected as the matching object for the current object based on the evaluated matching criterion. For example, in accordance with one embodiment described herein, the candidate matching object having a highest (e.g., maximum) value for the matching criterion (as compared with the matching criterion values of the other candidate matching objects based on, for example, the evaluation performed at block 625) may be selected at block 630 as the matching object for the current object. It should be understood, however, that it may be the case that no matching object is found (e.g., that there is no matching peak) for the current object. For example, the complementary spectrum may have no objects remaining for selection as a matching object, or the matching criterion may not allow for the selection of a remaining peak from the complementary spectrum. Advantageously, the system of the present disclosure is designed so that such a scenario (namely, there being no matching object) will generally only occur for minor peaks.

Although not shown in FIG. 6, following the selection of the matching object at block 630, the list location of the matching object may be identified (e.g., written, entered, inserted, etc.) in the fourth label of the current object and the location of the current object may be similarly identified in the fourth label of the selected matching object (e.g., in the example table 700 described above and shown in FIG. 7).

As described above, the example process 600 may be performed in an iterative manner for each of the objects (e.g., the process 600 may be looped over all of the objects) in the list of objects created at block 505 of the example process 500 (described above and illustrated in FIG. 5).

In accordance with at least one embodiment of the method, "near-by in frequency" is set to 100 Hz. The criterion is proportional to the peak value multiplied by a distance-dependent weighting that favors nearby peaks. That is, let j identify the candidate object, a (j) denote its peak value, and f (j) denote the frequency of the candidate object. The criterion is then:

$$\eta = a k \cdot w f k, f j, \quad (1)$$

where f(k) is the frequency of the current object and $w: \mathbb{R}_0^+ \times \mathbb{R}_0^+ \to \mathbb{R}_0^+$ is a function that maps the nonnegative real frequencies to a nonnegative real distance penalty value. A reasonable choice for w is a linear decay with distance, subject to a floor $f_0$:

$$w f k, f j = \max f_0 f_1 - f k - f j. \quad (2)$$

In accordance with at least one embodiment, $f_1$ is 100 Hz, and $f_0 = 1$.

It should be noted that in some situations not all peaks identified by the peak identification algorithm described above will obtain a match since some objects may be left without suitable candidate matching objects. In accordance with at least one embodiment described herein, such objects may be matched by creating a "virtual" peak with identical frequency and either zero amplitude or the amplitude of the complementary spectrum at that frequency (e.g., if the signal can be interpreted as a simple sum of sinusoids then the zero amplitude approach is more reasonable).

Interpolation

The interpolation of sinusoids can be performed in a variety of different ways. Accordingly, the following outlines some basic principles of the different interpolation approaches and describes the details of the interpolation method utilized in accordance with the embodiments of the present disclosure.

The parameters of a sinusoid are its amplitude, its frequency, and its phase. In the following, the term "phase offset" refers to the value of the phase at a particular reference time instant. Each of these parameters is specified for a peak of the spectrum. However, a complicating factor is that the frequency is the derivative of the phase. Thus, by performing linear interpolation of amplitude, frequency, and phase offset, the frequency suffers a deviation due the phase offset not being constant. This frequency deviation is constant across the interpolation interval and equal to one half the inverse of the interpolation interval or less.

Linear interpolation of the phase offset implies that the frequencies at the endpoints of the interpolation interval do not equal the values that were estimated at the endpoints of the interval. A first existing interpolation approach avoids this problem by performing third-order polynomial interpolation of the phase, with its value and derivative (the frequency) determined by the measurements at both endpoints. It is clear that this must lead to larger-but-shorter frequency excursions than linear phase offset interpolation as the overall phase precession must be identical as that of the linear phase offset interpolation case. An additional disadvantage of this first interpolation approach is that it leads to an irregular sampling of the sine function, which impedes the construction of computationally-efficient implementations.

In practice, the first interpolation approach described above was found to suffer from a reverberative nature for speech, which likely can be attributed to undesirable frequency excursions. For speech, the reverberative nature can be removed in a second existing interpolation approach that does not use the observed phase offset and instead uses a harmonic minimum phase model. However, this second approach is not appropriate for music where the sinusoids may not be harmonic. In addition, this second approach also does not preserve the speech waveform for harmonic signals.

By considering a sinusoid as the real part of a complex exponential, a third interpolation approach naturally arises. For example, consider cos ft+ϕ=$\Re$ (α exp ift) where f is frequency, t is time, ϕ is the phase offset, α is a complex coefficient, i=$\sqrt{-1}$, and the operator $\Re$ extracts the real component. It is then possible to perform a linear interpolation of both the frequency f and the complex coefficient α in time. In contrast to the first and second existing interpolation approaches described above, the interpolation of complex coefficients leads to variation of the amplitude over the interpolation interval. This third approach also facilitates a regular sampling of the complex exponential, which leads to low computational complexity.

For the scenario in which the set of sinusoids is harmonic and there is alignment of the resulting waveforms, the complex-coefficient interpolation resembles the waveform interpolation method for speech (e.g., waveform interpolation attempts to preserve the signal waveform). Waveform interpolation systems are generally less reverberant than the third-order polynomial interpolation approach for speech signals. In contrast to the second interpolation method (described above), the complex-coefficient interpolation preserves the waveform of the speech signal.

In accordance with one or more embodiments of the present disclosure, the complex-coefficient interpolation method is used. This method performs well if the original signal evolves smoothly and the length of the segment of reconstructed data equals the length of the missing data.

The interpolation performance of the system can be improved for voiced speech by exploiting the fact that such signals are harmonic in nature. If the sinusoidal frequencies are close to being harmonic, the reason that they are not perfectly harmonic likely is the result of measurement error. Thus, in a such a case the frequencies can be corrected to being harmonic. For example, in a practical implementation, sinusoids below 3000 Hz can first be tested if they belong to a voiced speech segment using the criterion $$\xi = \frac{1}{N}\sum_{n=1}^{N} a_n \left(1 - \frac{f_0}{f_n} \text{ round}\left(\frac{f_n}{f_0}\right)\right)^2,$$

where $f_0$ is the candidate pitch, $f_n$ is the frequency of sinusoid n, $\alpha_n$ is the magnitude of the sinusoid n, N is the number of sinusoids below 3000 Hz, and the function round $$\left(\frac{f_n}{f_0}\right)$$

rounds $$\frac{f_n}{f_0}$$

to the nearest integer. First, a search may be performed for the $f_0$ value that minimizes ξ and then a threshold for that best ξ can be used to decide if the signal is harmonic. If the signal is harmonic, frequencies that are close to being harmonic may be modified to being harmonic (e.g., a multiple of $f_0$).

Asynchronous Interpolation

The various interpolation approaches described above have focused on interpolation over given intervals that have the length of the missing data segment. In asynchronous interpolation, which may be utilized in accordance with one or more of the embodiments described herein, the length of the interval is adjusted with the aim to minimize the amplitude excursions in the interpolation since such excursions are audible as reverberation.

The linear interpolation of the complex coefficient of a sinusoid identified by the index n may be written as $$\alpha_n t = \alpha_{n,-} + \alpha_{n,1} t, \quad (3)$$

where t is time, where it is assumed that interpolation is started at t=0, where $\alpha_{n,-}$ is the starting value of the complex coefficient, and $\alpha_{n,1}$ is a coefficient affecting the rate of change. In addition, let $\alpha_{n,+}$ denote the estimated value for α for the observed future data and τ denote the nominal interpolation endpoint. Then, for linear interpolation equation (3) may be rewritten as $$\alpha_n t = \alpha_{n,-} + \frac{\alpha_{n,+} - \alpha_{n,-}}{\tau} t, \quad (4)$$

Let $f_{n,-}$ and $f_{n,+}$ represent the sinusoid frequency before and after the restoration gap. A reasonable objective is to find the interpolation interval τ that minimizes $$\eta = \sum_{n=1}^{N} \alpha_{n,+} - \frac{\alpha_{n,+}}{\alpha_{n,-}} \alpha_{n,-} \exp i \int_0^\tau f_{n,-} + \frac{f_{n,+} - f_{n,-}}{\tau} t \, dt^2 \quad (5)$$

$$= \sum_{n=1}^{N} \alpha_{n,+} - \frac{\alpha_{n,+}}{\alpha_{n,-}} \alpha_{n,-} \exp i \left( f_{n,-} \tau + \frac{1}{2} f_{n,+} - f_{n,-} \tau^2 \right) \quad (6)$$

$$= \sum_{n=1}^{N} \alpha_{n,+}^2 \frac{\alpha_{n,+}}{\alpha_{n,+}} - \frac{\alpha_{n,-}}{\alpha_{n,-}} \exp i \frac{f_{n,-} + f_{n,+} \tau^2}{2} \quad (7)$$

Equation (7) may be interpreted as follows. At each point in time the coefficients $\alpha_n$ and the frequencies $f_n$ characterize an "instantaneous" waveform. Then, the above result (equation (7)) can be understood as a measure of alignment of the instantaneous signal waveform. The factor $\alpha_{n,+}^2$ represents a weighting of the importance of sinusoid n. The term exp $$\frac{i \, f_{n,-} + f_{n,+} \tau}{2}$$

represents the precession of the phase of the sinusoid over the interval, and shows that the precession proceeds, on average, at the average of the initial and final frequencies. The ratios $$\frac{\alpha_{n,+}}{\alpha_{n,+}} \text{ and } \frac{\alpha_{n,-}}{\alpha_{n,-}}$$

represent the start and end phases. As such, the overall objective is consistent with finding an end time $\tau$ for the restoration interval that aligns the phases of the interpolated signal with that of the signal observed at the future end well.

In view of the above description of asynchronous interpolation, in accordance with one or more embodiments of the present disclosure, the level of interpolation that may be performed is selected from a range of interpolation intervals to maximize a measure of alignment of an instantaneous waveform produced by the interpolator and an instantaneous waveform estimated from a known signal segment. Furthermore, in accordance with one or more other embodiments described herein, the range of interpolation intervals may be chosen to fill a jitter buffer of a receiving device to a level consistent with expected packet losses.

It should be noted that, in accordance with at least one embodiment of the present disclosure, the factor $$\frac{\alpha_{n,+}}{\alpha_{n,-}}$$

in equation (5) may be omitted without sacrificing good performance, and at a lower computational complexity.

The following is a non-exhaustive list of example properties of the asynchronous interpolation process of the present disclosure in accordance with one or more embodiments:

(1) Because the alignment criterion (equation (7)), in general, has many minima, a search over the criterion should be performed.

(2) The asynchronous interpolation method of the present disclosure may be distinguished from a straightforward time-domain alignment procedure in that the method described herein includes the interpolation of the frequency.

(3) The asynchronous interpolation method of the present disclosure provides for the interpolation over segments of arbitrary length; a "reasonable" fit of the model with respect to observed data and missing segment length is no longer assumed.

(4) The interpolation method of the present disclosure may be used for slowing down and, to a certain extent, speeding-up audio segments, by inserting virtual missing segments and by removing data and using interpolation to eliminate discontinuities.

(5) The interpolation method described herein minimizes reverberation as it minimizes excursions of the sinusoids in amplitude. It is important to note in this respect that the complex-coefficient interpolation method has no frequency excursions in any case.

Figure 8:
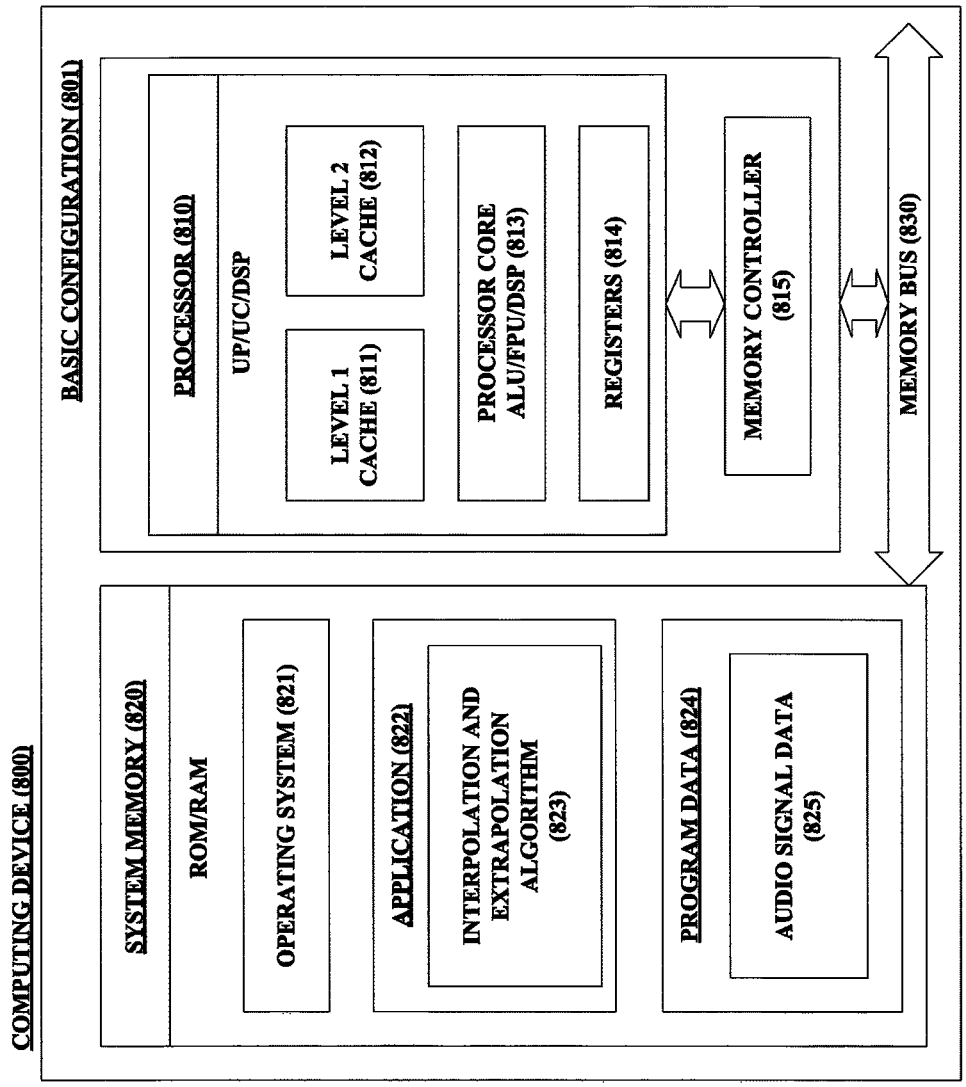
FIG. 8 is a block diagram illustrating an example computing device arranged for concealing missing segments and/or discontinuities in an audio signal based on interpolation and extrapolation of sinusoids according to one or more embodiments described herein.

FIG. 8 is a high-level block diagram of an exemplary computer (800) arranged for concealing (e.g., restoring) missing segments and/or discontinuities in an audio signal based on interpolation and extrapolation of sinusoids, according to one or more embodiments described herein. In a very basic configuration (801), the computing device (800) typically includes one or more processors (810) and system memory (820). A memory bus (830) can be used for communicating between the processor (810) and the system memory (820).

Depending on the desired configuration, the processor (810) can be of any type including but not limited to a microprocessor (μP), a microcontroller (μC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (816) can also be used with the processor (810), or in some implementations the memory controller (815) can be an internal part of the processor (810).

Depending on the desired configuration, the system memory (820) can be of any type including but not limited to volatile memory (such as RAM), non-volatile memory (such as ROM, flash memory, etc.) or any combination thereof. System memory (820) typically includes an operating system (821), one or more applications (822), and program data (824). The application (822) may include interpolation and extrapolation algorithm (823) for restoring a segment of consecutive missing data samples in an audio signal according to one or more embodiments described herein. Program Data (824) may include storing instructions that, when executed by the one or more processing devices, implement a method for concealing missing segments and/or discontinuities in an audio signal using interpolation and extrapolation operations designed for sinusoids according to one or more embodiments described herein.

Additionally, in accordance with at least one embodiment, program data (824) may include audio signal data (825), which may include data about samples of an audio signal obtained, for example, by windowing the signal. In accordance with at least one embodiment, a 32 millisecond (ms) window may be used which, at 16 kHz corresponds to 512 samples. In accordance with at least one other embodiment, the audio signal may be windowed with a Hann window and padded with zeros to obtain a sequence of 2048 samples, on which a Fast Fourier Transform (FFT) may be performed. In some embodiments, the application (822) can be arranged to operate with program data (824) on an operating system (821).

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (800) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method for restoring continuity of an audio signal, the method comprising:
    computing spectra of segments of an audio signal, the segments located on opposite sides of a missing segment of the audio signal;
    determining magnitude peaks of the computed spectra;
    ordering the determined peaks according to magnitude;
    determining neighbor peaks on the opposite side of the missing segment from the peaks that were ordered according to magnitude, beginning with a highest peak, thereby forming pairs of spectral peaks;
    performing complex-coefficient interpolation across the missing segment of the audio signal using the pairs of spectral peaks to generate restoration data for the missing segment; and
    using the generated restoration data to restore the continuity of the audio signal.

2. The method of claim 1, wherein the interpolation is sinusoidal interpolation.

3. The method of claim 1, wherein each pair of peaks is comprised of a first peak on a first side of the missing segment and a second peak on a second side of the missing segment.

4. The method of claim 1, wherein neighbor peaks are determined for each of the peaks beginning with the highest peak.

5. The method of claim 1, wherein using the restoration data comprises fading the restoration data with data of the segments located on opposite sides of the missing segment.

6. The method of claim 5, wherein the restoration data is faded with data of the segments located on opposite sides of the missing segment using an overlap-add operation.

7. The method of claim 1, further comprising:
    performing a fast Fourier transform on the signal to generate a frequency-domain representation of the signal;
    smoothing a magnitude spectrum of the transformed signal;
    determining a sign of the local slope of the smoothed spectrum;
    generating estimates of the peaks based on points where the sign of the local slope changes from positive to negative; and
    determining true locations for each of the peaks by searching the unsmoothed signal in a neighborhood of the corresponding estimated peak.

8. The method of claim 7, wherein the magnitude spectrum of the signal is smoothed by applying a low-pass filter to the spectrum.

9. The method of claim 1, wherein an interval of the interpolation performed is selected from a range of interpolation intervals to maximize a measure of alignment of an instantaneous waveform produced by the interpolator and an instantaneous waveform estimated from a known signal segment.

10. The method of claim 9, wherein the range of interpolation intervals is chosen to fill a jitter buffer of a receiving device to a level consistent with expected packet losses.

11. A computer-implemented method for restoring continuity in an audio signal, the method comprising:
computing a spectrum of a first segment of an audio signal and a spectrum of a second segment of the audio signal, wherein the first segment is located on a first side of a missing segment of the signal and the second segment is located on a second side of the missing segment of the signal;
identifying a plurality of objects in the spectra of the first segment and the second segment, wherein the plurality of objects corresponds to peaks;
ordering the identified objects according to amplitudes of the corresponding peaks;
determining an index of the ordered objects;
identifying based on the index of the ordered objects, beginning with a highest amplitude, for at least one of the objects, a matching object;
performing complex-coefficient interpolation across the missing segment of the audio signal using the at least one object and the matching object to generate restoration data for the missing segment;
using the generated restoration data to restore the continuity of the audio signal.

12. The method of claim 11, wherein a matching object is identified for the at least one of the objects beginning with the object with the largest peak and continuing to the object with the smallest peak, according to the index of the sorted objects.

13. The method of claim 11, wherein identifying the plurality of objects in the spectra of the first segment and the second segment includes creating a list of objects, one object for each peak of both the spectra of the first segment and the spectra of the second segment.

14. The method of claim 13, wherein the list of objects includes, for each of the objects in the list, an amplitude of the corresponding peak, a frequency where the corresponding peak is located, a label specifying if the corresponding peak belongs to the first or second spectrum, and a location of a matching peak in the spectrum complementary to the spectrum in which the corresponding peak belongs.

15. The method of claim 11, wherein identifying, for at least one of the objects, a matching object includes:
identifying, for an object, candidate matching objects by performing a search over all other objects;
eliminating from the candidate matching objects all objects that already have a matching object;
evaluating, for each of the remaining candidate matching objects, a matching criterion; and
selecting one of the remaining candidate matching objects as the matching object for the object based on the evaluated matching criterion.

16. The method of claim 15, wherein the one of the remaining candidate matching objects is selected as the matching object based on the candidate matching object having a highest value for the evaluated matching criterion.

17. The method of claim 15, further comprising restricting the remaining candidate matching objects to objects with peaks from the complementary spectrum and objects with peaks that are nearby in frequency.

18. The method of claim 15, further comprising:
identifying an object without candidate matching objects; and
creating a virtual peak having a frequency identical to the frequency of the object and having either zero amplitude or an amplitude of the complementary spectrum at the identical frequency.

19. The method of claim 15, further comprising:
identifying an object without candidate matching objects; and
eliminating the object from the plurality of objects.

20. A computer-implemented method for restoring continuity in an audio signal, the method comprising: computing spectra of segments of an audio signal, the segments located on opposite sides of a missing segment of the audio signal;
determining magnitude peaks of the computed spectra;
ordering the determined peaks according to magnitude;
determining neighbor peaks on the opposite side of the missing segment from the peaks that were ordered according to magnitude, beginning with a highest peak, thereby forming pairs of spectral peaks; and
performing interpolation across an interval of the missing segment of the audio signal to generate restoration data for the missing segment, wherein a length of the interval is determined based on aligning corresponding sets of phase offsets weighted according amplitudes of the phase offsets; and
using the generated restoration data to restore the continuity of the audio signal.

* * * * *